US011889605B1

(12) United States Patent
Zhu et al.

(10) Patent No.: US 11,889,605 B1
(45) Date of Patent: Jan. 30, 2024

(54) LIGHT-EMITTING DATA TRANSMISSION METHOD, LIGHT-EMITTING CONTROL METHOD, DEVICE, STORAGE MEDIUM, AND PRODUCT

(71) Applicants: Shenzhen Intellirocks Tech. Co., Ltd., Shenzhen (CN); Shenzhen Qianyan Technology LTD, Shenzhen (CN)

(72) Inventors: Jiajun Zhu, Shenzhen (CN); Wenlong Wu, Shenzhen (CN)

(73) Assignees: Shenzhen Intellirocks Tech. Co., Ltd., Shenzhen (CN); Shenzhen Qianyan Technology LTD., Shenzhen (CN)

( * ) Notice: Subject to any disclaimer, the term of this patent is extended or adjusted under 35 U.S.C. 154(b) by 0 days.

(21) Appl. No.: 18/456,470

(22) Filed: Aug. 25, 2023

(30) Foreign Application Priority Data

Mar. 28, 2023 (CN) .......................... 202310314118.0

(51) Int. Cl.
*H05B 47/155* (2020.01)
*H05B 45/20* (2020.01)
*H05B 47/175* (2020.01)
*G06T 11/60* (2006.01)

(52) U.S. Cl.
CPC ............ *H05B 47/155* (2020.01); *G06T 11/60* (2013.01); *H05B 45/20* (2020.01); *H05B 47/175* (2020.01)

(58) Field of Classification Search
CPC .... H05B 47/155; H05B 47/175; H05B 45/20; Y02B 20/40; G06T 11/60
See application file for complete search history.

(56) References Cited

U.S. PATENT DOCUMENTS

| | | | | |
|---|---|---|---|---|
| 10,619,397 | B2* | 4/2020 | Gregoriou | E06B 9/68 |
| 11,415,308 | B1* | 8/2022 | Haney | F21V 23/06 |
| 2013/0201364 | A1* | 8/2013 | Shimizu | H04N 23/73 |
| | | | | 348/229.1 |
| 2017/0048403 | A1* | 2/2017 | Baba | H04N 1/00251 |
| 2018/0367843 | A1* | 12/2018 | Han | H04N 21/41407 |
| 2023/0016150 | A1* | 1/2023 | Domino | H05B 47/175 |

FOREIGN PATENT DOCUMENTS

| | | |
|---|---|---|
| CN | 106598528 | 4/2017 |
| CN | 112885634 | 6/2021 |

* cited by examiner

*Primary Examiner* — Haissa Philogene
(74) *Attorney, Agent, or Firm* — KIP Legal Services, PLLC

(57) ABSTRACT

A light-emitting data transmission method includes obtaining display layout information of a lamp, and generating a dot matrix drawing interface on a display interface corresponding to the display layout information. The lamp includes a plurality of light-emitting units, and each curtain light is mapped to a coordinate point in the dot matrix drawing interface. The method also includes obtaining bitmap graphic data generated by receiving an external editing instruction from the dot matrix drawing interface, converting the bitmap graphic data into bitmap image data in a predetermined image format, and outputting the bitmap image data to a controller, so that the controller parses the bitmap image data into the light-emitting information corresponding to each light-emitting unit. The light-emitting information is used to control the corresponding light-emitting unit to emit light, such that light emitted by the plurality of light-emitting units are combined to form a predetermined light effect.

12 Claims, 4 Drawing Sheets

LIGHT-EMITTING DATA TRANSMISSION METHOD, LIGHT-EMITTING CONTROL METHOD, DEVICE, STORAGE MEDIUM, AND PRODUCT

CROSS-REFERENCES TO RELATED APPLICATIONS

This application claims priority to Chinese Patent Application No. CN202310314118.0, filed on Mar. 28, 2023, the content of which is hereby incorporated by reference in entirety.

FIELD OF THE TECHNOLOGY

The present disclosure relates to the field of smart home technologies and, in particular, relates to a light-emitting data transmission method, a light-emitting control method, a device, a storage medium, and a product.

BACKGROUND OF THE DISCLOSURE

Curtains are generally used to shade or adjust indoor light. With the continuous development of the curtain industry, curtains have become an indispensable interior decoration that combines functionality and decoration perfectly. Further, along with change with the times and the improvement of consumers' aesthetic concepts, the curtain industry has introduced curtains with various colorful LED light strings that play a decorative role, and multiple sets of curtains with LED light strings have been combined and installed, forming a specific style and special lighting effects. For example, the LED light strings are arranged in an array form to drive LED lights at predetermined positions in the LED light strings to emit light, so as to form predetermined patterns or characters on the curtains, enriching entertainment life. However, current data transmission processes to LED lights often incur delay or data loss during the data transmission processes, affecting lighting effects and the user experience.

The disclosed methods and apparatus are directed to solve one or more problems set forth above and other problems.

SUMMARY

According to one aspect of the present disclosure, a light-emitting data transmission method is provided. The method includes: obtaining display layout information of a lamp, and generating a dot matrix drawing interface on a display interface corresponding to the display layout information. The lamp is a curtain light assembly that includes a plurality of curtain lights as light-emitting units, and each curtain light is mapped to a coordinate point in the dot matrix drawing interface. The method also includes obtaining bitmap graphic data generated by receiving an external editing instruction from the dot matrix drawing interface, converting the bitmap graphic data into bitmap image data in a predetermined image format, and outputting the bitmap image data to a controller of the lamp, so that the controller parses the bitmap image data into the light-emitting information corresponding to each light-emitting unit of the lamp. The light-emitting information is used to control the corresponding light-emitting unit to emit light, such that light emitted by the plurality of light-emitting units are combined to form a predetermined light effect of the lamp.

According to another aspect of the present disclosure, a light-emitting control method is provided. The method includes: in response to an information acquisition instruction sent by an external device, sending display layout information of the lamp to the external device, so that the external device generates a dot matrix drawing interface on a display interface corresponding to the display layout information. The lamp is a curtain light assembly including a plurality of curtain lights as light-emitting units, the plurality of curtain lights are arranged in a dot matrix structure, and each curtain light is mapped to a coordinate point in the dot matrix drawing interface. The external device is used to acquire dot matrix graphic data formed by receiving an external editing command from the dot matrix drawing interface, convert the dot matrix graphic data into bitmap image data, and send out the bitmap image data. The method also includes receiving the bitmap image data in a predetermined image format sent by the external device; parsing the bitmap image data into light-emitting information corresponding to each light-emitting unit of the lamp; and sending the light-emitting information to a control unit of each corresponding light-emitting unit, so that the control unit controls light-emitting elements electrically connected to the control unit to change a light-emitting state, so that light emitted by each light-emitting unit is combined to form a predetermined light effect of the lamp.

According to another aspect of the present disclosure, a non-transitory computer-readable storage medium is provided. The non-transitory computer-readable storage medium contains computer-executable program codes for, when executed by one or more processors, performing a light-emitting data transmission method is provided. The method includes: obtaining display layout information of a lamp, and generating a dot matrix drawing interface on a display interface corresponding to the display layout information. The lamp is a curtain light assembly that includes a plurality of curtain lights as light-emitting units, and each curtain light is mapped to a coordinate point in the dot matrix drawing interface. The method also includes obtaining bitmap graphic data generated by receiving an external editing instruction from the dot matrix drawing interface, converting the bitmap graphic data into bitmap image data in a predetermined image format, and outputting the bitmap image data to a controller of the lamp, so that the controller parses the bitmap image data into the light-emitting information corresponding to each light-emitting unit of the lamp. The light-emitting information is used to control the corresponding light-emitting unit to emit light, such that light emitted by the plurality of light-emitting units are combined to form a predetermined light effect of the lamp.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

Figure 1:
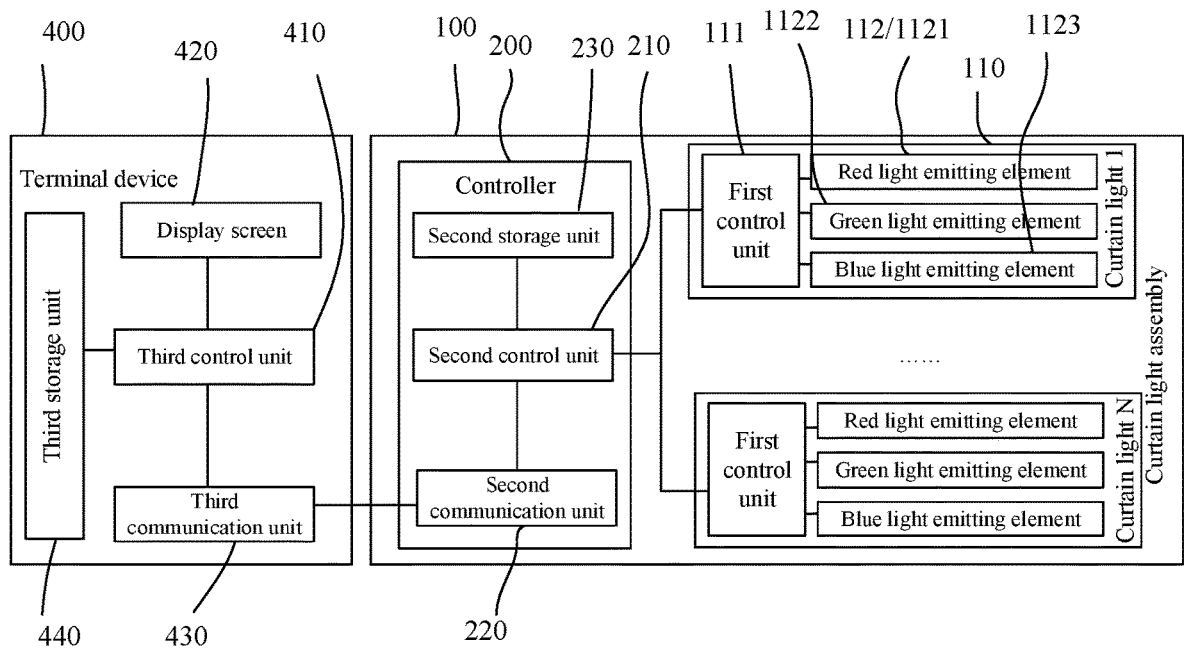
FIG. 1 illustrates a schematic diagram of a curtain light assembly according to an embodiment of the present disclosure.

The following describes exemplary embodiments in detail, and examples of the embodiments are shown in the accompanying drawings, so as to better understand the present disclosure. Unless otherwise specified, a same number in different drawings may represent a same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

Those skilled in the art will understand that unless otherwise stated, the singular forms "a", "an", "said" and "the" used herein may also include plural forms. It should be further understood that the word "comprising" used in the description of the present disclosure refers to the presence of said features, integers, steps, operations, elements and/or components, but does not exclude the presence or addition of one or more other features, integers, steps, operations, elements and/or components, but does not preclude the presence or addition of one or more other features, integers, steps, operations, elements, components and/or groups thereof. It will be understood that when an element is referred to as being "connected" or "coupled" to another element, it can be directly connected or coupled to the other element or intervening elements may also be present. Additionally, "connected" or "coupled" as used herein may include wireless connection or wireless coupling. The expression "and/or" used herein includes all or any elements and all combinations of one or more associated listed items.

Those skilled in the art can understand that, unless otherwise defined, all terms (including technical terms and scientific terms) used herein have the same meaning as commonly understood by those of ordinary skill in the art to which this invention belongs. It should also be understood that terms, such as those defined in commonly used dictionaries, should be understood to have meanings consistent with their meaning in the context of the prior art, and unless specifically defined as herein, are not intended to be idealized or have overly formal meaning.

According to the present disclosure, in order to form a predetermined pattern or text on the curtain through the LED light strings, the user generally sets the information of the pattern or text that needs to be displayed on the LED light strings through a terminal device, such as with application software on the mobile phone, and then transmits the pattern or text information to the controller in the LED lights. The controller controls the corresponding LED lights to emit predetermined light based on the obtained pattern or text information, so as to form the corresponding pattern or text on the curtain.

Specifically, the user obtains the coordinate values of each LED light in the LED light strings on the curtain through the terminal device, and sets the light-emitting data of the LED lights on each coordinate value. The terminal device then sends the corresponding coordinate values and the associated light-emitting data to the controller, and the controller obtains the coordinate values and the associated light-emitting data to control the LED lights on the corresponding coordinate values to emit a predetermined light effect, so as to display a predetermined pattern or text light effect on the curtain.

However, the amount of data sent by the terminal device to the controller is greatly affected by the size of the coordinate values (that is, by the number of LED lights in the LED light strings), the more coordinates, the greater the amount of data. For example, only Use one color to fill 20 coordinate values, the data size is 3 Byte (RGB)+20 Byte (20 coordinate values), a total of 23 Byte. If 200 coordinate values are filled, it will be 203 Byte. It can be seen that the data size and the number of coordinate values are proportional. When the number of coordinate values exceeds 255, the data will need two digits to accurately express the information of a coordinate during transmission. For example, the data size of a color filled with 260 coordinate values is 3 Byte (RGB)+260*2 Byte (260 coordinate values, the first bit indicates the high position of the coordinate value, and the second bit indicates the low position of the coordinate value), a total of 523 Byte. Thus, a curtain light assembly with a large number of LED lights will put great pressure on the data transmission between the terminal device and the controller, and it is easy to cause delay or data loss during the data transmission process, which will affect the pattern or text effect displayed on the curtain by the LED light strings, and reduce the user experience.

The present disclosure provides an improved light-emitting data transmission method, through which a terminal device converts the dot matrix graphic data generated by receiving an external editing instruction into bitmap image data, and outputs the bitmap image data to the controller of the curtain light assembly. The controller parses the bitmap image data to obtain the light-emitting information of each light-emitting unit, and controls the light-emitting unit to emit a predetermined lighting effect.

To facilitate the description of the light-emitting data transmission method, the present disclosure describes the light-emitting data transmission method in conjunction with a curtain light system. Referring to FIG. 1, the curtain light system includes a terminal device 400 and a curtain light assembly 100.

The curtain light assembly 100 includes a controller 200 and a plurality of curtain lights 110. The lamp in the light-emitting data transmission method is the curtain light assembly 100, and the light-emitting elements are the curtain lights 110. The light-emitting data transmission method is not limited by the curtain light assembly, and can be applied in different scenarios. For example, the light-emitting data transmission method can be applied to a curtain wall light assembly of a building, etc.

The controller 200 is electrically connected to the plurality of curtain lights 110 respectively, and the terminal device 400 is wirelessly connected to the controller 200 to establish a data communication link.

The curtain light 110 includes a first control unit 111 and a plurality of light-emitting elements 112, and the first control unit 111 is electrically connected to the plurality of light-emitting elements 112 respectively. The curtain light assembly 100 is matched with the curtain 300, and the curtain light assembly 100 may be arranged on the curtain 300 or not directly on the curtain 300. In one embodiment, the curtain light 110 is a light bead.

In one embodiment, the curtain light 110 includes three light-emitting elements 112, and the three light-emitting elements include a red light-emitting element 1121, a green light-emitting element 1122, and a blue light-emitting element 1123. The first control unit 111 controls the light intensity and/or light frequency of the light-emitting elements 112 by sending control instructions to the three light-emitting elements 112.

Specifically, the first control unit 111 enables the curtain light 110 to emit light of any color by controlling the light emission of the three light-emitting elements 112. The first control unit 111 controls the light frequency, light intensity, and/or lighting duration of the three light-emitting elements 112, so that the curtain light 110 can continuously change the light color, light intensity, and/or lighting duration.

In one embodiment, when the curtain light assembly 100 is disposed on the curtain 300, the multiple curtain lights 110 of the curtain light assembly 100 are all disposed on the curtain 300.

In one embodiment, when the curtain light assembly 100 is not arranged on the curtain 300, the curtain light assembly 100 may be arranged close to the curtain 300. For example, the curtain light assembly 100 is arranged close to the curtain 300, and the plurality of curtain lights 110 of the curtain light assembly 100 are arranged in a predetermined form or structure, for example, the plurality of curtain lights 110 of the curtain light assembly 100 are arranged in a dot matrix structure.

In another embodiment, the curtain lights 110 of the curtain light assembly 100 can be used as a curtain. For example, a plurality of curtain lights 110 form a light string, and a plurality of light strings together form a curtain structure. Such formed light-curtain may be used alone or together with other types of curtains.

In one embodiment of the present disclosure, for convenience of description, the curtain light assembly 100 includes a plurality of curtain lights 110, for example, the curtain light assembly 100 is matched with a curtain 300. The curtain 300 includes a first surface and a second surface, and a plurality of curtain lights 110 are respectively arranged on the same area or different areas of the first surface or the second surface of the curtain 300, or a plurality of curtain lights 110 are respectively arranged on the first surface and/or the second surface of the curtain.

Figure 2:
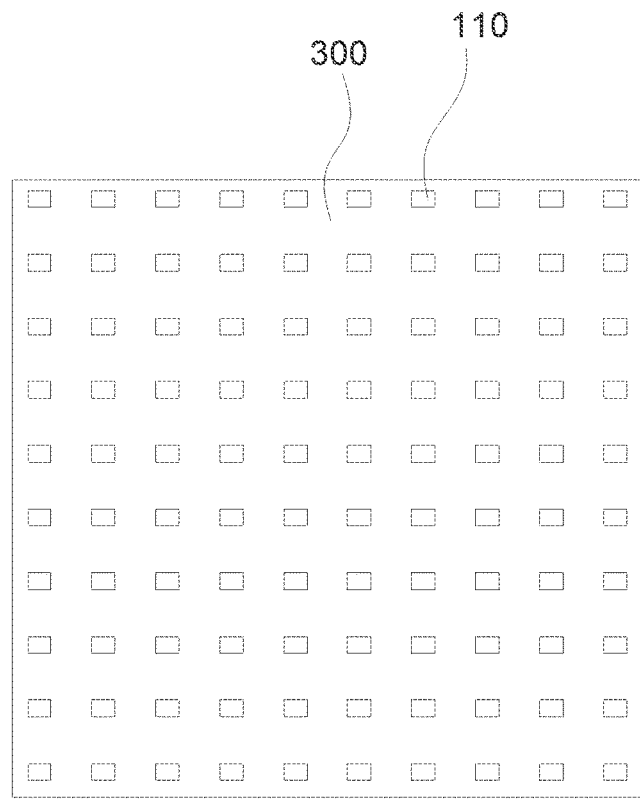
FIG. 2 illustrates a schematic diagram of a plurality of curtain lights of a curtain light assembly arranged on a curtain according to an embodiment of the present disclosure.

In one embodiment, with reference to FIG. 2, the plurality of curtain lights 110 of the curtain light assembly 100 are all arranged on the first surface of the curtain 300, and the plurality of curtain lights 110 are respectively arranged on different areas of the first surface of the curtain 300.

Specifically, the plurality of curtain lights 110 are sequentially arranged along the extension direction of the curtain 300, and the extension direction may be the expanding and contracting direction of the curtain 300.

Referring to FIG. 2, a plurality of the curtain lights 110 are arranged in a dot matrix structure, and each curtain light 110 is equivalent to a coordinate point, so that by controlling the plurality of curtain lights 110 of the curtain light assembly 100 to emit light, a predetermined lighting effect can be displayed on the curtain 300. For example, the lighting effects include that the light emitted by the plurality of curtain lights 110 forms one or more of static or dynamic lighting graphics, texts, and symbols.

The controller 200 includes a second control unit 210, a second communication unit 220, and a second storage unit 230. The second control unit 210 is electrically connected to the second communication unit 220 and the second storage unit 230, respectively. The second control unit 210 is also electrically connected to the plurality of curtain lights 210. For example, the second control unit 210 is electrically connected to the first control unit 111 of the curtain light 210 through a serial peripheral interface.

The controller 200 is electrically connected to each curtain light 110, and obtains the position information of each curtain light 110 on the curtain 300. The position information of the plurality of curtain lights 110 constitutes the display layout information of the curtain light assembly 100. After obtaining the display layout information, the controller 200 may store the display layout information in its second storage unit 230.

After the second control unit 210 of the controller 200 receives the bitmap image data sent by the terminal device 400 through the second communication unit 220, the second control unit 210 converts the bitmap image data into the light-emitting information corresponding to each curtain light 110 based on the display layout information. The second control unit 210 of the controller 200 outputs the light-emitting information to the corresponding curtain light 110, so that the curtain light 110 emits a predetermined light, and multiple curtain lights 110 emit light together to form a predetermined lighting effect.

The terminal device 400 includes a third control unit 410, a display screen 420, a third communication unit 430, and a third storage unit 440. The third control unit 410 is electrically connected to the display screen 420, the third communication unit 430, and the third storage unit 440, and the third control unit 410 is wirelessly connected to the second control unit 210 of the controller 200 via the third communication unit 430, so as to establish a data communication link. In one embodiment, the terminal device 400 is a computer, a mobile phone, or a tablet computer, etc.

The third control unit 410 of the terminal device 400 can retrieve the display layout information of the curtain light assembly 100 from the controller 200, and generate a dot matrix drawing interface on the display interface of the display screen 420 corresponding to the display layout information. The dot matrix drawing interface contains multiple coordinate points, and each coordinate point corresponds to a curtain light 110 in the curtain light assembly 100. The dot matrix drawing interface can receive external editing instructions to form dot matrix graphic data on the dot matrix drawing interface. After the editing is completed, the third control unit 410 converts the dot matrix graphic data into bitmap image data. The third communication unit 430 outputs the bitmap image data to the controller 200.

After the second control unit 210 of the controller 200 receives the bitmap image data outputted by the terminal device 400 via the second communication unit 220, the coordinate points in the bitmap image data are mapped and correlated to the position information of each curtain light 110 of the curtain light assembly 100. Further, light-emitting data corresponding to each coordinate point is mapped and correlated to the corresponding position information, and light-emitting information is generated. The second control unit 210 outputs the corresponding lighting information to the corresponding curtain light 110 to control the corresponding curtain light 110 to emit predetermined light, and multiple curtain lights 110 emit light together to form a predetermined lighting effect of the curtain light assembly 100.

In one embodiment, the curtain light assembly 100 can also be arranged on the curtain wall of a building, and used as a curtain wall light of the building to enrich the display effect of the curtain wall.

Figure 3:
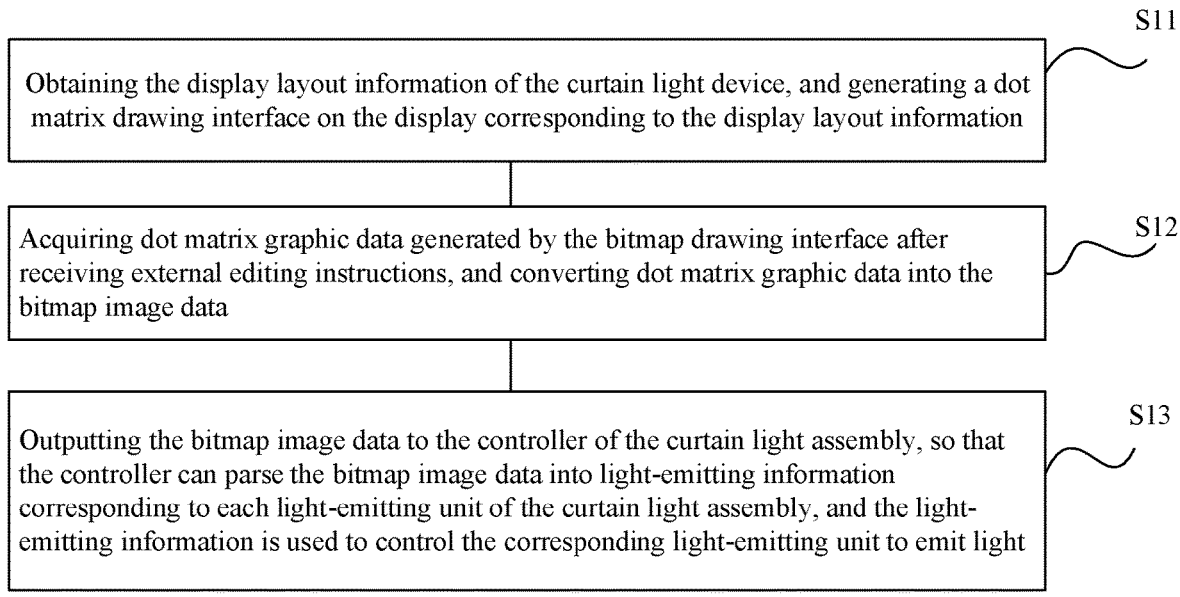
FIG. 3 illustrates a schematic flowchart of a light-emitting data transmission method according to an embodiment of the present disclosure.

In one embodiment of the present disclosure, a light-emitting data transmission method is implemented based on the above-described curtain light assembly. Specifically, referring to FIG. 3, the light-emitting data transmission method includes the following.

S11, obtaining the display layout information of the curtain light device, and generating a dot matrix drawing interface on the display corresponding to the display layout information.

The terminal device is wirelessly connected to the second communication unit of the controller through its third communication unit, so that a data communication link is established between the terminal device and the controller. The third control unit of the terminal device sends an information acquisition instruction to the controller through the third communication unit, and after the second control unit of the controller receives the information acquisition instruction sent by the terminal device through the second communication unit, the second control unit obtains the display layout information stored in the second storage unit of the controller, and sends the display layout information to the terminal device via the second communication unit.

The display layout information includes position information of the plurality of curtain lights of the curtain light assembly. After the third control unit of the terminal device receives the display layout information via the third communication unit, the third control unit generates a dot matrix drawing interface on the display interface of the display screen corresponding to the display layout information, and the dot matrix drawing interface contains a plurality of coordinate points, and the plurality of coordinate points are generated corresponding to the position information of the plurality of curtain lights. That is, each coordinate point is mapped to a corresponding curtain light.

Figure 4:
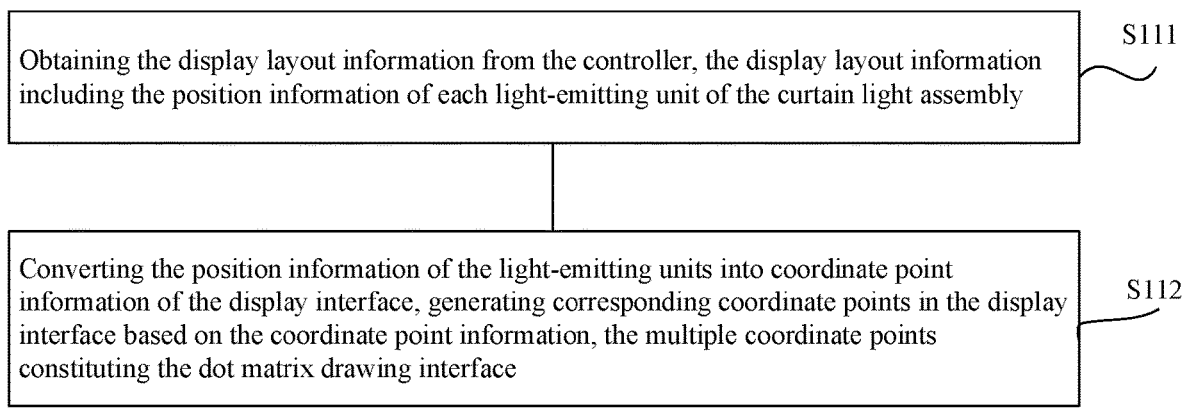
FIG. 4 illustrates a schematic flowchart of S11 of the light-emitting data transmission method according to an embodiment of the present disclosure.

Specifically, with reference to FIG. 4, the S11 also includes the following steps.

S111, obtaining the display layout information from the controller, the display layout information including the position information of each light-emitting unit (i.e., curtain light) of the curtain light assembly.

The terminal device obtains the display layout information of the curtain light assembly from the controller, and the display layout information includes position information of each curtain light of the curtain light assembly. For example, when the curtain in the unfolded state is set as a plane, a plurality of curtain lights of the curtain light assembly are arranged on the plane, and the position information of each curtain light of the plurality of curtain lights on the plane constitutes the display layout information. Further, the plurality of curtain lights are arranged on the plane in the form of a dot matrix. The plurality of curtain lights are arranged with certain rules, for example, arranging the positions of the curtain lights in the form of coordinate points, and obtaining the coordinate values of the curtain lights can obtain the position information of the curtain lights. Alternatively, the plurality of curtain lights are named in the form of labels, and the position of the curtain lights corresponding to each label can be preset, and the position information of the curtain lights can be obtained by obtaining the labels of the curtain lights.

For the convenience of describing the present disclosure below, the plurality of curtain lights of the curtain light assembly are arranged on the plane of the curtain in the form of a dot matrix, which is set as the layout form of the curtain light assembly.

S112, converting the position information of the light-emitting units into coordinate point information of the display interface, generating corresponding coordinate points in the display interface based on the coordinate point information, the multiple coordinate points constituting the dot matrix drawing interface.

After the third control unit of the terminal device obtains the display layout information of the curtain light assembly, the third control unit obtains the position information of the plurality of curtain lights of the curtain light assembly from the display layout information, and converts the position information into coordinate point information of the display interface. The third control unit generates corresponding coordinate points in the display interface based on the coordinate point information, so as to generate a plurality of coordinate points in the display interface, and the plurality of coordinate points together form a dot matrix drawing interface in the display interface. That is, the curtain lights are mapped to the corresponding coordinate points in the dot matrix drawing interface, so as to simulate the layout of the plurality of curtain lights of the curtain light assembly through the dot matrix drawing interface, and to draw the display effect of the plurality of curtain lights of the curtain light assembly through the dot matrix drawing interface.

In one embodiment, each coordinate point in the dot matrix drawing interface is a visible point. The coordinate point can also be invisible in the dot matrix drawing interface.

S12, acquiring dot matrix graphic data generated by the bitmap drawing interface after receiving external editing instructions, and converting dot matrix graphic data into the bitmap image data.

The dot matrix drawing interface can receive external editing instruction(s), and generate dot matrix graphic data on the dot matrix graphic interface. For example, the color of one or more coordinate points on the bitmap drawing interface is set by an external editing instruction and the bitmap graphic is generated. Or, the dot matrix drawing interface is to connect a plurality of coordinate points in the dot matrix drawing interface through the external editing instruction, generate dot matrix graphics on the dot matrix drawing interface, and set the color of the corresponding coordinate points.

In one embodiment, the external editing instruction can be triggered by an external tool such as a mouse or a stylus. Alternatively, the display screen is a touch screen, and the user can also trigger the external editing instruction by touching the display screen with a finger.

After the dot matrix graphic is drawn in the dot matrix drawing interface, the third control unit of the terminal device acquires the dot matrix graphic data, and converts the dot matrix graphic data into bitmap image data. In one embodiment, the bitmap image is any one of PNG (portable network graphics) format, JPG (joint photographic experts group) format, BMP (bitmap) format, and WEBP format. In one embodiment, the bitmap image is in PNG format.

S13, outputting the bitmap image data to the controller of the curtain light assembly, so that the controller can parse the bitmap image data into light-emitting information corresponding to each light-emitting unit of the curtain light assembly, and the light-emitting information is used to control the corresponding light-emitting unit to emit light.

After the third control unit of the terminal device acquires the bitmap image data, the third control unit sends the bitmap image data to the outside through the third communication unit. The second communication unit of the controller receives the bitmap image data and transmits the received bitmap image data to the second control unit. After receiving the bitmap image data, the second control unit obtains the light-emitting information corresponding to each curtain light in the curtain light assembly from the bitmap image data.

The light-emitting information includes coordinate point information and light-emitting data. The coordinate point information is mapped to the position information of the corresponding curtain light, and the light-emitting data includes one or more of RGB data, light intensity data, and light-emitting frequency data, etc. Using the position information mapped by the coordinate point information, the second control unit sends the light-emitting information to the corresponding curtain lights in a directional manner.

After receiving the corresponding light-emitting information outputted by the second control unit, the first control unit of the curtain light obtains corresponding light-emitting data from the light-emitting information. The first control unit controls the red light-emitting element, the green light-emitting element, and the blue light-emitting element of the curtain light to emit light based on the RGB data in the light-emitting data, controls the plurality of light-emitting elements to emit light with a predetermined light intensity based on the light intensity data, and/or controls a plurality of light-emitting elements to emit light at a predetermined light-emitting frequency. Thus, the first control unit controls the plurality of light-emitting elements to emit predetermined light based on the light-emitting data.

The plurality of curtain lights of the curtain light assembly each emit predetermined light, and the light emitted by each of the plurality of curtain lights is combined to form a predetermined light effect of the curtain light assembly. For example, the light emitted by multiple curtain lights are combined to form one or more of static or dynamic light-emitting graphics, characters, and symbols.

Figure 5:
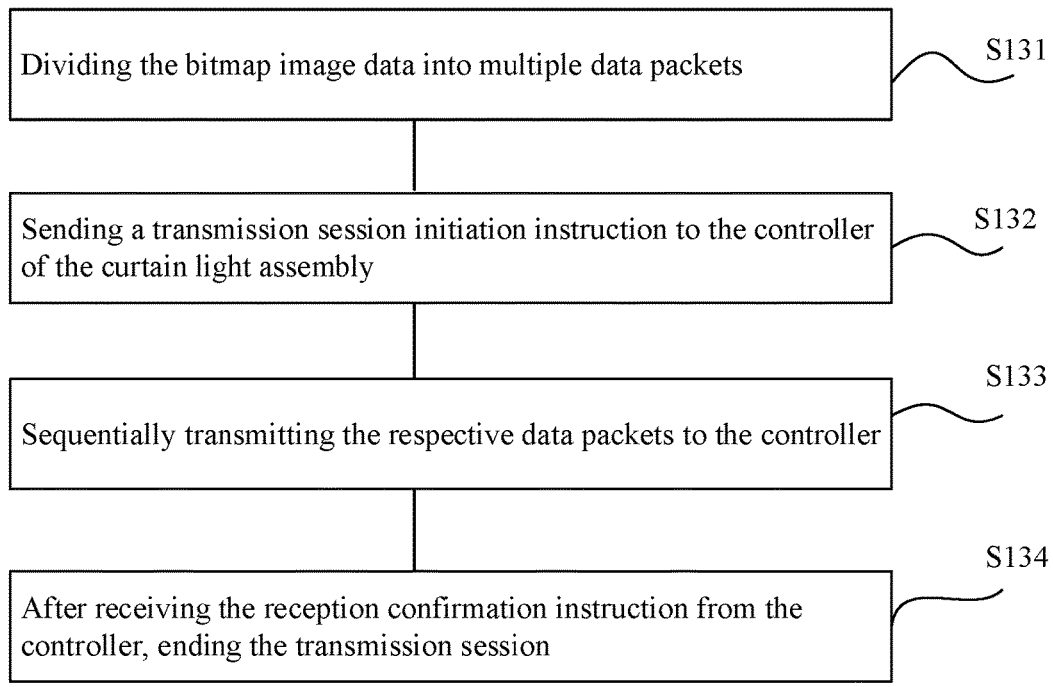
FIG. 5 illustrates a schematic flowchart of S13 of the light-emitting data transmission method according to an embodiment of the present disclosure.

In one embodiment, in S13, with reference to FIG. 5, the following specific steps are further included.

S131, dividing the bitmap image data into multiple data packets.

In order to reduce the transmission pressure of the terminal device to send data to the controller, so that the terminal device can output the bitmap image data or the controller can receive the bitmap image data with good quality, the third control unit of the terminal device divides the bitmap image data into multiple data packets and sends out the data packets individually. Thus, when the terminal equipment outputs data to the controller, the transmission pressure can be reduced, avoiding data loss during the transmission process.

S132, sending a transmission session initiation instruction to the controller of the curtain light assembly.

The third controller of the terminal device sends a transmission session initiation instruction to the controller via the third communication unit. After the second control unit of the controller receives the transmission session initiation instruction via the second communication unit, the second control unit establishes a transmission session with the third control unit via the second communication unit and the third communication unit.

S133, sequentially transmitting the respective data packets to the controller.

After the transmission session is established between the terminal device and the controller, the terminal device sequentially sends the multiple data packets formed by dividing the same bitmap image data to the controller. The data volume of the data packet is much smaller than the data volume of the entire bitmap image data, so that when the terminal device sends the individual data packet to the controller, data loss is less likely to occur.

S134, after receiving the reception confirmation instruction from the controller, ending the transmission session.

After receiving all the data packets belonging to the same bitmap image data and verifying the correctness of the data packets, the second control unit of the controller reassembles all the data packets into the bitmap image data. Further, the second control unit outputs a reception confirmation instruction to the third control unit, and the confirmation instruction indicates that the bitmap image data is received successfully. After receiving the confirmation instruction, the third control unit ends the transmission session.

Figure 6:
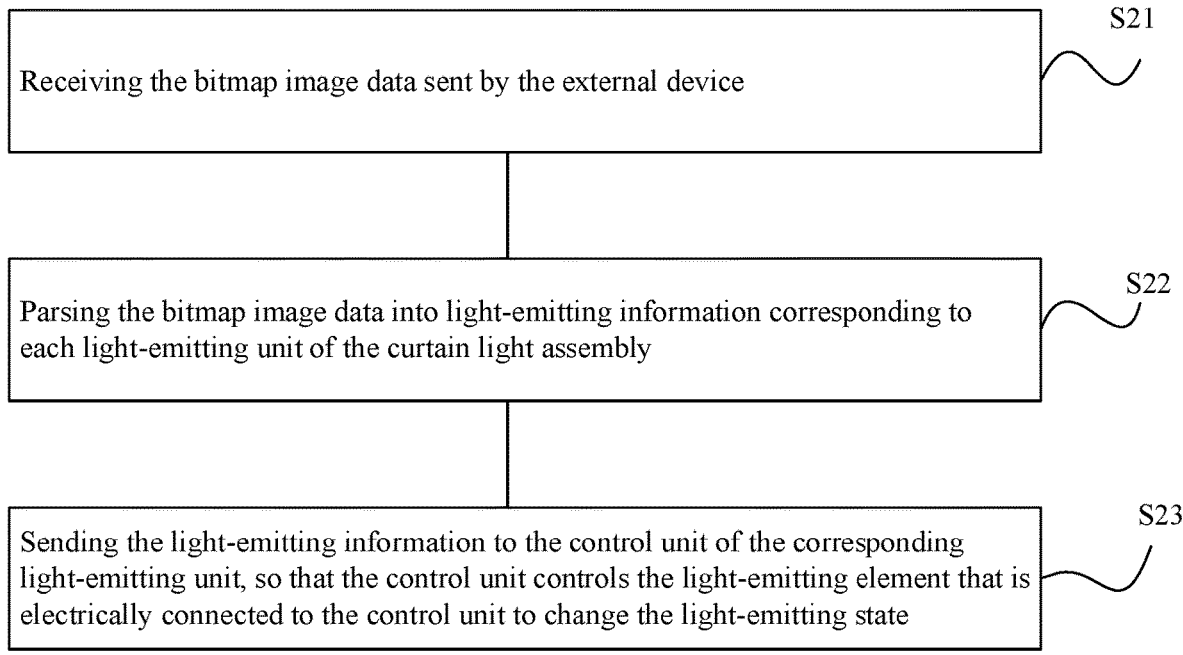
FIG. 6 illustrates a schematic flowchart of a lighting-emitting control method according to an embodiment of the present disclosure.

The present disclosure also provides a light-emitting control method, which is also implemented in combination with the curtain light assembly. Specifically, referring to FIG. 6, the light-emitting control method includes the following.

S21, receiving the bitmap image data sent by the external device.

Figure 7:
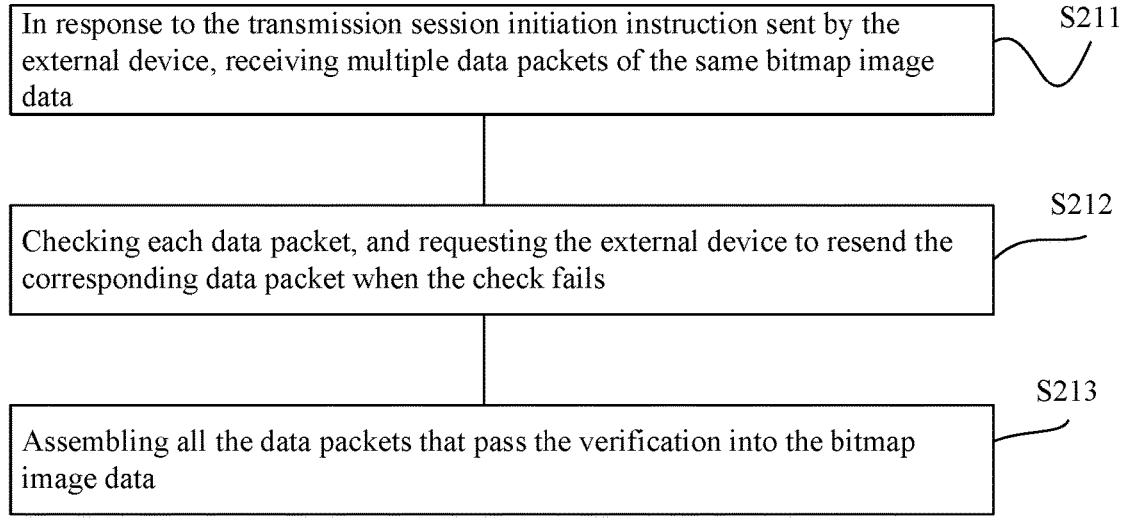
FIG. 7 illustrates a schematic flowchart of S21 of the lighting-emitting control method according to an embodiment of the present disclosure.

The controller receives the bitmap image data sent by the external device, and the external device refers to, for example, the terminal device mentioned above. With reference to FIG. 7, the following specific steps are included in S21.

S211, in response to the transmission session initiation instruction sent by the external device, receiving multiple data packets of the same bitmap image data.

The controller establishes a transmission session with the terminal device in response to the transmission session initiation instruction sent by the terminal device, so as to facilitate data transmission between the terminal device and the controller. Specifically, the terminal device divides the bitmap image data into multiple data packets, and the terminal device sequentially sends the multiple data packets belonging to the same bitmap image data to the controller, so as to avoid transmission of a large data file between the terminal device and the controller, which may result in data loss. After the data transmission between the terminal device and the controller is completed, the transmission session between the terminal device and the controller is terminated.

S212, checking each data packet, and requesting the external device to resend the corresponding data packet when the check fails.

When the terminal device divides the bitmap image data into multiple data packets, the terminal device assigns a verification code to each data packet. After receiving the data packet, the controller checks the verification code to determine whether data loss occurs in the transmission process of the data packet. If the controller detects that there is data loss in the data packet, the controller sends a resend instruction to the terminal device, and the resend instruction includes identification information of the data packet. After receiving the resending instruction, the terminal device resends the corresponding data packet to the controller according to the identification information in the resending instruction.

S213, assembling all the data packets that pass the verification into the bitmap image data.

When the terminal device divides the bitmap image data into multiple data packets, it assigns corresponding headers to the multiple data packets, so that the controller can reassemble the multiple data packets based on the header of each data packet to form the bitmap image data. For example, the bitmap image data is divided into three data packets, and the headers of the three data packets are 1/3, 2/3, and 3/3, respectively.

S22, parsing the bitmap image data into light-emitting information corresponding to each light-emitting unit of the curtain light assembly.

After obtaining the bitmap image data sent by the terminal device, the controller parses and converts the bitmap image data into light-emitting information corresponding to the plurality of curtain lights of the curtain light assembly, and the light-emitting information includes position information of the curtain lights with light-emitting data. The controller sends the light-emitting information to the corresponding curtain light based on the position information in the light-emitting information, and controls the curtain light to emit predetermined light.

Figure 8:
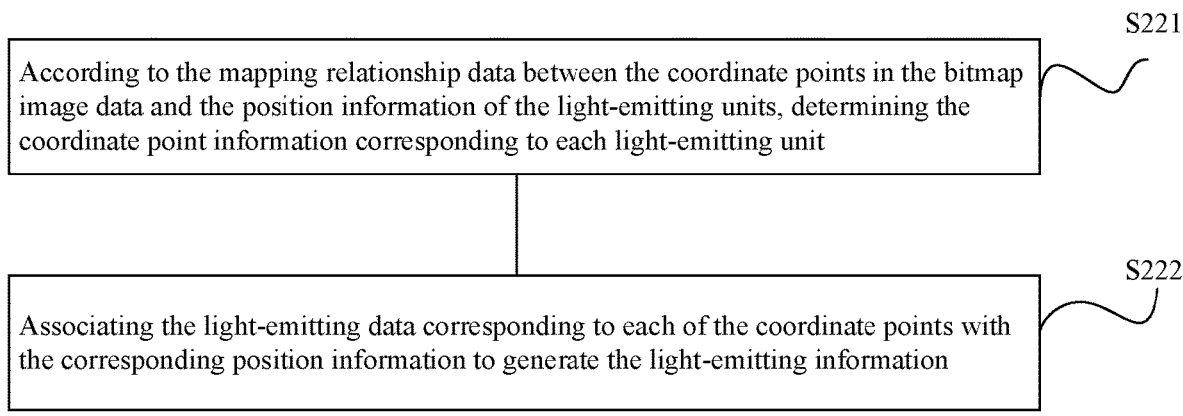
FIG. 8 illustrates a schematic flowchart of S22 of the lighting-emitting control method according to an embodiment of the present disclosure.

Specifically, with reference to FIG. 8, the S22 includes the following.

S221, according to the mapping relationship data between the coordinate points in the bitmap image data and the position information of the light-emitting units, determining the coordinate point information corresponding to each light-emitting unit.

The controller has the display layout information of the curtain light assembly, and the display layout information includes position information of each curtain light of the curtain light assembly. After acquiring the bitmap image data, the controller associates the bitmap image data with the display layout information, to obtain the mapping relationship between the coordinate points in the bitmap image data and the position information of the curtain lights, and associates the curtain lights with coordinate points in the bitmap image data.

S222, associating the light-emitting data corresponding to each of the coordinate points with the corresponding position information to generate the light-emitting information.

Each coordinate point of the bitmap image data is associated with light-emitting data, and the controller extracts the light-emitting data corresponding to each coordinate point information from the bitmap image data according to the coordinate point information and, then, according to the association relationship between the coordinate point information and the position information of the curtain lights, associates the light-emitting data with the position information of the corresponding curtain light to generate light-emitting information. In one embodiment, the light-emitting data is RGB data and/or light intensity data.

S23, sending the light-emitting information to the control unit of the corresponding light-emitting unit, so that the control unit controls the light-emitting element that is electrically connected to the control unit to change the light-emitting state.

The controller sends the light-emitting information to the control unit of the curtain light corresponding to the position information based on the position information in the light-emitting information. The control unit receives the light-emitting information, parses the light-emitting data from the light-emitting information, and controls the plurality of light-emitting elements of the curtain light to emit light based on the light-emitting data, so that the curtain light emits predetermined light.

Further, the controller acquires the light-emitting information corresponding to each curtain light based on the bitmap image data, and controls the plurality of curtain lights of the curtain light assembly to emit predetermined light based on the acquired light-emitting information. The light emitted by the curtain lights constitutes a predetermined lighting effect.

In one embodiment, S24 and S25 may also be included. For example, before S21 is performed, the bitmap image data is generated through S24 and S25, and the bitmap image data is sent to the controller.

S24, in response to an information acquisition instruction sent by the external device, sending the display layout information of the curtain light assembly to the external device, so that the external device generates a dot matrix drawing interface on its display interface corresponding to the display layout information.

S25, the external device is used to obtain the dot matrix graphic data formed by receiving external editing instructions from the dot matrix drawing interface, convert the dot matrix graphic data into bitmap image data, and send out the converted the bitmap image data.

For the specific description of S24 and S25, please refer to the above description of S11 and S12 in the light-emitting data transmission method.

Figure 9:
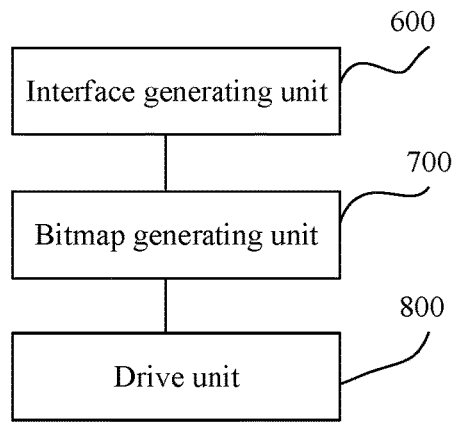
FIG. 9 illustrates a schematic diagram of a light-emitting data transmission device according to an embodiment of the present disclosure.

The present disclosure also provides a light-emitting data transmission device, referring to FIG. 9, the device includes an interface generating unit 600, a bitmap generating unit 700, and a drive unit 800, etc.

The interface generating unit 600 acquires the display layout information of the curtain light assembly, and generates a dot matrix drawing interface on the display interface corresponding to the display layout information.

The bitmap generating unit 700 obtains bitmap graphic data generated after receiving an external editing command from the bitmap drawing interface, and converts the bitmap graphic data into bitmap image data.

The drive unit 800 outputs the bitmap image data to the controller of the curtain light assembly, so that the controller can parse the bitmap image data into the light-emitting information corresponding to each light-emitting unit of the curtain light assembly, and the light-emitting information is used to control the corresponding light-emitting unit to emit light.

The present disclosure also provides a storage medium storing computer-readable instructions. When the computer-readable instructions are executed by one or more processors, the one or more processors perform or cause to perform the various steps of the light-emitting data transmission method or the light-emitting control method.

The present disclosure also provides a computer program product containing computer programs/instructions. When the computer programs/instructions are executed by one or more processors, the various steps of the light-emitting data transmission method or the light-emitting control method in any embodiment of the present disclosure are implemented.

Those of ordinary skill in the art can understand that all or part of the processes in the methods of the above-mentioned embodiments of the present disclosure can be implemented by instructing related hardware through a computer program, and the computer program can be stored in a computer-readable storage medium. When the program is executed, it may implement the processes of the embodiments of the above-mentioned methods. The storage medium may be a computer-readable storage medium such as a magnetic disk, an optical disk, a read-only memory (ROM), or a random access memory (RAM), etc.

Accordingly, the light-emitting data transmission method of the present disclosure includes obtaining the display layout information of the curtain light assembly by the terminal device, generating a dot matrix drawing interface, editing on the dot matrix drawing interface and generating dot matrix graphics, and converting the dot matrix graphics into bitmap image data, outputting the bitmap image data to the controller. The controller analyzes the bitmap image data to obtain the light-emitting information of each curtain light, the controller sends the light-emitting information to the corresponding curtain light, and controls the curtain light to emit predetermined light. The light emitted by each of the multiple curtain light constitutes the light-emitting special effect of the curtain light assembly.

Accordingly, the present disclosure has certain technical advantages. On the one hand, the light-emitting data transmission method of the present disclosure converts the dot matrix graphic data into bitmap image data. Compared with the traditional conversion of dot matrix graphic data into coordinate value information and luminous data, the conversion into bitmap image data can significantly reduce the size of the data volume, and facilitate the outputting of bitmap image data without causing data transmission pressure, making it easy to use in application scenarios such as curtain lights, improving the data transmission efficiency of curtain lights, and facilitating curtain lights to receive data in time to emit corresponding light.

On the other hand, in the light-emitting control method of the present disclosure, the controller analyzes or parses the bitmap image data to obtain the light-emitting information of each light-emitting unit, controls the corresponding light-emitting unit to emit light according to the light-emitting information, and the controller associates the bitmap image data with the position information of each light-emitting unit of the curtain lamp, improving the association correlation degree, so that the curtain lamp can better display the lighting effect.

Those skilled in the art can understand that the various operations, methods, and steps, measures, and schemes in the processes that have been discussed in this disclosure can be replaced, changed, combined, or deleted. Furthermore, the various operations, methods, and other steps, measures, and schemes in the process that have been discussed in this disclosure can also be replaced, changed, rearranged, decomposed, combined, or deleted. Further, steps, measures, and schemes in the prior art that have operations, methods, and processes disclosed in the present application may also be alternated, changed, rearranged, decomposed, combined, or deleted.

Finally, it should be noted that: the above embodiments are only used to illustrate the technical solutions of the present disclosure, but not to limit the present disclosure. Although the present disclosure has been described in detail with reference to the foregoing embodiments, those of ordinary skill in the art should understand that modifications can be made to the technical solutions described in the foregoing embodiments, or equivalent replacements are made to some of the technical features; and these modifications or replacements do not drive the essence of the corresponding technical solutions away from the spirit and scope of the technical solutions of the various embodiments of the present disclosure.

What is claimed is:

1. A light-emitting data transmission method, comprising:
   obtaining display layout information of a lamp, and generating a dot matrix drawing interface on a display interface corresponding to the display layout information, wherein the lamp is a curtain light assembly including a plurality of curtain lights as light-emitting units, and each curtain light is mapped to a coordinate point in the dot matrix drawing interface;
   obtaining bitmap graphic data generated by receiving an external editing instruction from the dot matrix drawing interface, and converting the bitmap graphic data into bitmap image data in a predetermined image format; and
   outputting the bitmap image data to a controller of the lamp, so that the controller parses the bitmap image data into the light-emitting information corresponding to each light-emitting unit of the lamp, wherein the light-emitting information is used to control the corresponding light-emitting unit to emit light, such that light emitted by the plurality of light-emitting units are combined to form a predetermined light effect of the lamp.

2. The light-emitting data transmission method according to claim 1, wherein the obtaining display layout information of a lamp, and generating a dot matrix drawing interface on a display interface corresponding to the display layout information further includes:
   obtaining display layout information from a controller, the display layout information including position information of each light-emitting unit of the lamp; and
   correspondingly converting the position information of each light-emitting unit into coordinate point information on a display interface, and generating corresponding coordinate points on the display interface based on the coordinate point information, and the coordinate points constitute the dot matrix drawing interface.

3. The light-emitting data transmission method according to claim 1, wherein the outputting the bitmap image data to the controller of the lamp further comprises:
   dividing the bitmap image data into multiple data packets;
   sending a transmission session initiation instruction to the controller of the lamp;
   sequentially transmitting the multiple data packets to the controller; and
   after receiving a reception confirmation instruction of the controller, completing the transmission session.

4. A light-emitting control method, comprising:
   in response to an information acquisition instruction sent by an external device, sending display layout information of a lamp to the external device, so that the external device generates a dot matrix drawing interface on a display interface corresponding to the display layout information, wherein the lamp is a curtain light assembly including a plurality of curtain lights as light-emitting units, the plurality of curtain lights are arranged in a dot matrix structure, and each curtain light is mapped to a coordinate point in the dot matrix drawing interface, and wherein the external device is used to acquire dot matrix graphic data formed by receiving an external editing command from the dot matrix drawing interface, convert the dot matrix graphic data into bitmap image data, and send out the bitmap image data;

receiving the bitmap image data in a predetermined image format sent by the external device;

parsing the bitmap image data into light-emitting information corresponding to each light-emitting unit of the lamp; and sending the light-emitting information to a control unit of each corresponding light-emitting unit, so that the control unit controls light-emitting elements electrically connected to the control unit to change a light-emitting state, so that light emitted by each light-emitting unit is combined to form a predetermined light effect of the lamp.

5. The light-emitting control method according to claim 4, wherein the receiving the bitmap image data in a predetermined image format sent by the external device further comprises:

in response to a transmission session initiation instruction sent by the external device, receiving multiple data packets of same bitmap image data;

verifying each of the multiple data packets, and requesting the external device to resend a corresponding data packet when verification fails; and assembling the multiple data packets that pass verification into the bitmap image data.

6. The light-emitting control method according to claim 4, wherein the parsing the bitmap image data into light-emitting information corresponding to each light-emitting unit of the lamp further comprises:

according to a mapping relationship data between coordinate points in the bitmap image data and position information of the light-emitting units, determining coordinate point information corresponding to each light-emitting unit; and associating light-emitting data corresponding to each of the coordinate points with the corresponding position information to generate the light-emitting information.

7. A non-transitory computer-readable storage medium containing computer-executable instructions for, when executed by one or more processors, performing a light-emitting control method according to claim 4.

8. The non-transitory computer-readable storage medium according to claim 7, wherein the receiving the bitmap image data in a predetermined image format sent by the external device further comprises:

in response to a transmission session initiation instruction sent by the external device, receiving multiple data packets of same bitmap image data;

verifying each of the multiple data packets, and requesting the external device to resend a corresponding data packet when verification fails; and assembling the multiple data packets that pass verification into the bitmap image data.

9. The non-transitory computer-readable storage medium according to claim 8, wherein the parsing the bitmap image data into light-emitting information corresponding to each light-emitting unit of the lamp further comprises:

according to a mapping relationship data between coordinate points in the bitmap image data and position information of the light-emitting units, determining coordinate point information corresponding to each light-emitting unit; and associating light-emitting data corresponding to each of the coordinate points with the corresponding position information to generate the light-emitting information.

10. A non-transitory computer-readable storage medium containing computer-executable instructions for, when executed by one or more processors, performing a light-emitting data transmission method, the method comprising:

obtaining display layout information of a lamp, and generating a dot matrix drawing interface on a display interface corresponding to the display layout information, wherein the lamp is a curtain light assembly including a plurality of curtain lights as light-emitting units, and each curtain light is mapped to a coordinate point in the dot matrix drawing interface;

obtaining bitmap graphic data generated by receiving an external editing instruction from the dot matrix drawing interface, and converting the bitmap graphic data into bitmap image data in a predetermined image format; and outputting the bitmap image data to a controller of the lamp, so that the controller parses the bitmap image data into the light-emitting information corresponding to each light-emitting unit of the lamp, wherein the light-emitting information is used to control the corresponding light-emitting unit to emit light, such that light emitted by the plurality of light-emitting units are combined to form a predetermined light effect of the lamp.

11. The non-transitory computer-readable storage medium according to claim 10, wherein the obtaining display layout information of a lamp, and generating a dot matrix drawing interface on a display interface corresponding to the display layout information further includes:

obtaining display layout information from a controller, the display layout information including position information of each light-emitting unit of the lamp; and correspondingly converting the position information of each light-emitting unit into coordinate point information on a display interface, and generating corresponding coordinate points on the display interface based on the coordinate point information, and the coordinate points constitute the dot matrix drawing interface.

12. The non-transitory computer-readable storage medium according to claim 10, wherein the outputting the bitmap image data to the controller of the lamp further comprises:

dividing the bitmap image data into multiple data packets;

sending a transmission session initiation instruction to the controller of the lamp;

sequentially transmitting the multiple data packets to the controller; and after receiving a reception confirmation instruction of the controller, completing the transmission session.

\* \* \* \* \*